L. BASTET.
Improvement in Electric Batteries.
No. 119,298.
Patented Sep. 26, 1871.
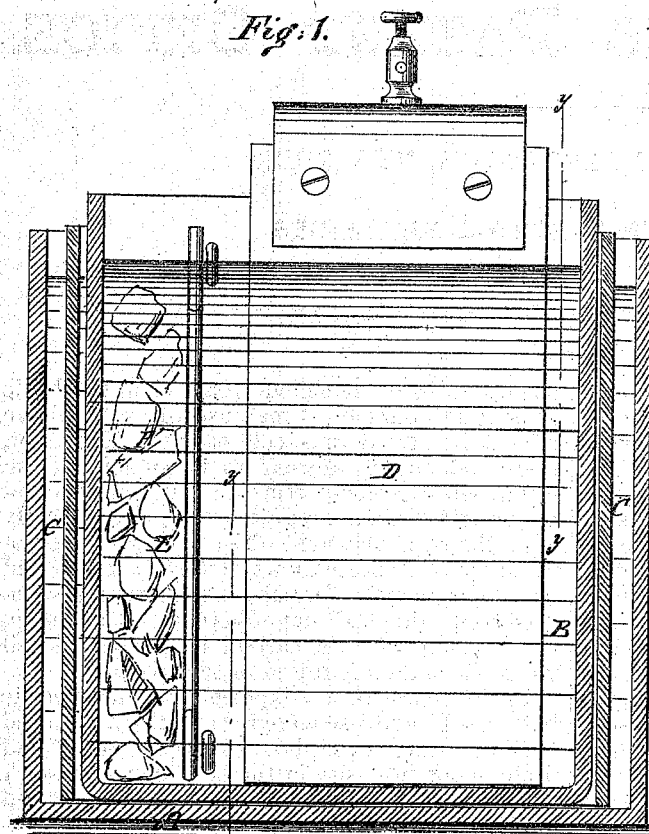
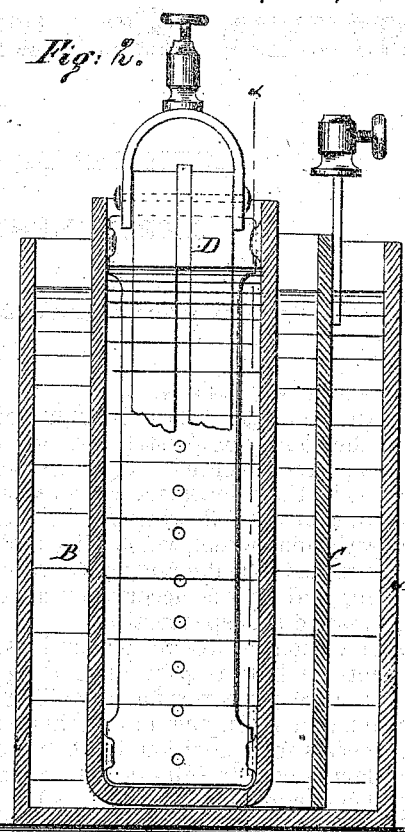
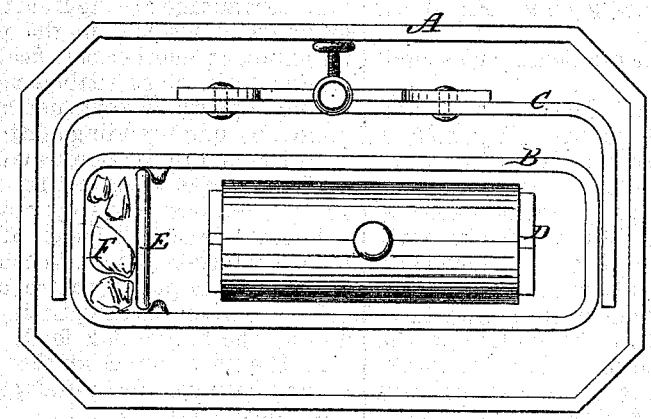

119,298

UNITED STATES PATENT OFFICE.

LOUIS BASTET, OF TARRYTOWN, NEW YORK.

IMPROVEMENT IN ELECTRIC BATTERIES.

Specification forming part of Letters Patent No. 119,298, dated September 26, 1871.

*To all whom it may concern:*

Be it known that I, LOUIS BASTET, of Tarrytown, in the county of Westchester and State of New York, have invented a new and useful Improvement in Electric Batteries; and I do hereby declare that the following is a full, clear, and exact description thereof, which will enable others skilled in the art to make and use the same, reference being had to the accompanying drawing forming part of this specification.

This invention relates to new and useful improvements in batteries for generating electric or electro-magnetic power for propelling electric or electro-magnetic engines or for other purposes; and it consists in a partition in the porous cell, and in placing certain salts in a dry state in the inferior compartment of the porous cell, by means of which the intensity and quantity of electricity generated is greatly increased and its strength prolonged.

In the accompanying drawing, Figure 1 is a vertical section of my improved battery taken on the line $x\ x$, Fig. 2. Fig. 2 is a vertical section of Fig. 1 on the lines $y\ y\ y\ y$. Fig. 3 is a top view.

Similar letters of reference indicate corresponding parts.

A is the casing, made of glass or other suitable material. B is the porous cell, which is placed in the case A, surrounded with water acidulated with sulphuric acid. C is the zinc plate, which is placed in the water between the porous cell and the case. D is the carbon within the porous cell. These parts are common and form no part of my present invention either in their construction or arrangement, as they have heretofore been used; but I now place in the battery a partition, E, perforated or otherwise, made so that the liquid in the porous cell will enter the compartment F thus partitioned off. This compartment may be situated in any portion of the porous cell or connected with the cell in any other manner, so that the dividing partition or wall is so perforated that the liquid may freely enter the compartment thus partitioned off. Into this compartment I introduce two salts in a dry state—namely, bichromate of potash and nitrate of potash or nitrate of soda. In the porous cell I have a sufficient quantity of sulphuric acid at 45° Baumé. I may use the salts above named in any porous-cell battery. I do not, therefore, confine myself to introducing them into a separate compartment; but I have found by experience that the salts work more perfectly with the sulphuric acid when the two are separated by a perforated partition, so that the acid may flow freely to the salts, but so that the undissolved salts shall not adhere to or in any manner interfere with the carbon in the porous cell when the carbon is raised or lowered.

In the course of my experiments with electric batteries I have discovered that these salts, used in the manner described, greatly increase and prolong the intensity of the effects produced. I am aware that various solutions have been used in electric batteries; I have used various solutions myself; but, from some cause—I am unable to determine what—I have never been able to produce the desired effect otherwise than by using the above-mentioned salts in the manner described.

An advantage arising from the use of my salts, as above described, in the porous cell is the formation of another chemical compound in my external cell, which enables me to use the external liquid, without replenishing for an unlimited period, by simply adding a little pure water every time I recharge the porous cell.

Having thus described my invention, I claim as new, and desire to secure by Letters Patent—

1. The use of bichromate of potash, nitrate of potash or nitrate of soda, in combination with sulphuric acid in place of nitric acid in the porous cell of a carbon battery, in the manner described and for the purpose set forth.

2. The partition E in the porous cell of an electric battery, substantially as and for the purposes described.

3. One or more compartments, substantially as seen at F, in combination with the porous cell of an electric battery, for the purposes described.

LOUIS BASTET.

Witnesses:
GEO. W. MABEE,
T. B. MOSHER.

(31)